US010843215B1

(12) United States Patent
Douma et al.

(10) Patent No.: US 10,843,215 B1
(45) Date of Patent: Nov. 24, 2020

(54) METHOD OF MASKING REAR SLIDER WINDOW APPLIQUES

(71) Applicant: Magna Mirrors of America, Inc., Holland, MI (US)

(72) Inventors: David G. Douma, West Olive, MI (US); Raymond C. LaHaie, III, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/223,259

(22) Filed: Dec. 18, 2018

Related U.S. Application Data

(60) Provisional application No. 62/607,594, filed on Dec. 19, 2017.

(51) Int. Cl.
| | | |
|---|---|---|
| *B05B 12/24* | (2018.01) | |
| *B05D 1/32* | (2006.01) | |
| *B60J 11/08* | (2006.01) | |
| *B60J 1/20* | (2006.01) | |
| *B60J 1/18* | (2006.01) | |
| *B29C 63/04* | (2006.01) | |

(52) U.S. Cl.
CPC .............. *B05B 12/24* (2018.02); *B05D 1/322* (2013.01); *B29C 63/04* (2013.01); *B60J 1/1853* (2013.01); *B60J 1/2094* (2013.01); *B60J 11/08* (2013.01)

(58) Field of Classification Search
CPC ........ B05B 12/24; B05D 1/322; B60J 1/1853; B60J 1/2094; B60J 11/08; B29C 63/04
USPC .......................... 156/240, 247, 250, 540, 449
See application file for complete search history.

(56) References Cited

U.S. PATENT DOCUMENTS

| | | | |
|---|---|---|---|
| 5,853,895 A | 12/1998 | Lewno | |
| 6,068,719 A | 5/2000 | Lewno | |
| 6,319,344 B1 | 11/2001 | Lewno | |
| 6,691,464 B2 | 2/2004 | Nestell et al. | |
| 6,846,039 B2 | 1/2005 | Lewno | |
| 7,003,916 B2 | 2/2006 | Nestell et al. | |
| 7,073,293 B2 | 7/2006 | Galer | |
| 7,332,225 B2 | 2/2008 | Lewno | |
| 7,838,115 B2 | 11/2010 | Lewno | |
| 8,187,409 B2 * | 5/2012 | Anderson | B65H 37/005 156/297 |

(Continued)

FOREIGN PATENT DOCUMENTS

WO WO-2012037190 A2 * 3/2012 ............ B60J 1/1853

*Primary Examiner* — Sonya M Sengupta
(74) *Attorney, Agent, or Firm* — Honigman LLP

(57) ABSTRACT

A method of applying a film to upper and lower appliques of a rear slider window assembly includes providing a support structure and positioning a rear slider window assembly at the support structure, with the rear slider window assembly including spaced apart fixed window panels, upper and lower appliques extending between the spaced apart fixed window panels, and a frame portion attached at the fixed window panels and appliques. An applicator includes first and second applicating devices for dispensing a strip of film onto a respective applique. The applicator is moved to a starting position where a roller of each applicating device presses an end region of the film onto the respective applique, and then is moved along the appliques with the rollers rolling along the respective appliques to press the film onto the appliques. The film strips are cut and pressed onto the respective appliques.

18 Claims, 11 Drawing Sheets

(56) References Cited

U.S. PATENT DOCUMENTS

| | | |
|---|---|---|
| 8,322,073 B2 | 12/2012 | Lewno |
| 8,402,695 B2 | 3/2013 | Smith et al. |
| 2003/0213179 A1 | 11/2003 | Galer |
| 2004/0020131 A1 | 2/2004 | Galer et al. |
| 2006/0107600 A1 | 5/2006 | Nestell et al. |
| 2008/0127563 A1 | 6/2008 | Tooker |
| 2011/0056140 A1 | 3/2011 | Lewno |
| 2013/0174488 A1 | 7/2013 | Snider et al. |
| 2013/0255156 A1* | 10/2013 | Snider .................. B60J 1/1853 49/130 |

\* cited by examiner

METHOD OF MASKING REAR SLIDER WINDOW APPLIQUES

CROSS REFERENCE TO RELATED APPLICATION

The present application claims the filing benefits of U.S. provisional application Ser. No. 62/607,594, filed Dec. 19, 2017, which is hereby incorporated herein by reference in its entirety.

FIELD OF THE INVENTION

The present invention relates to movable or slider window assemblies for vehicles and, more particularly to a side or rear slider window assembly for a vehicle.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails and may be moved along the rails to open and close the window. When it is desired to apply a mask (such as a white mask typically applied to new or prototype vehicles), the mask is applied to the window manually as strips of tape at the window panels and appliques.

SUMMARY OF THE INVENTION

The present invention provides a method and system for masking the appliques of a rear slider window assembly using an automatic applicator that applies the masking strips or film strips at both the upper and lower appliques at the same time. The system provides an applicator that has first and second applicating devices, each of which is operable to dispense a strip of film onto a respective one of the appliques. The applicator is moved to a starting position where a roller of each applicating device presses an end region of the respective film strip onto the respective applique. The applicator is then moved along the appliques with a roller of each applicating device rolling along the respective applique to press the film onto the respective applique. The film strips at the ends of the appliques are cut and pressed onto the respective applique and optionally onto inboard edge regions of the fixed window panels adjacent to the appliques.

These and other objects, advantages, purposes and features of the present invention will become apparent upon review of the following specification in conjunction with the drawings.

DESCRIPTION OF THE PREFERRED EMBODIMENTS

Figure 1:
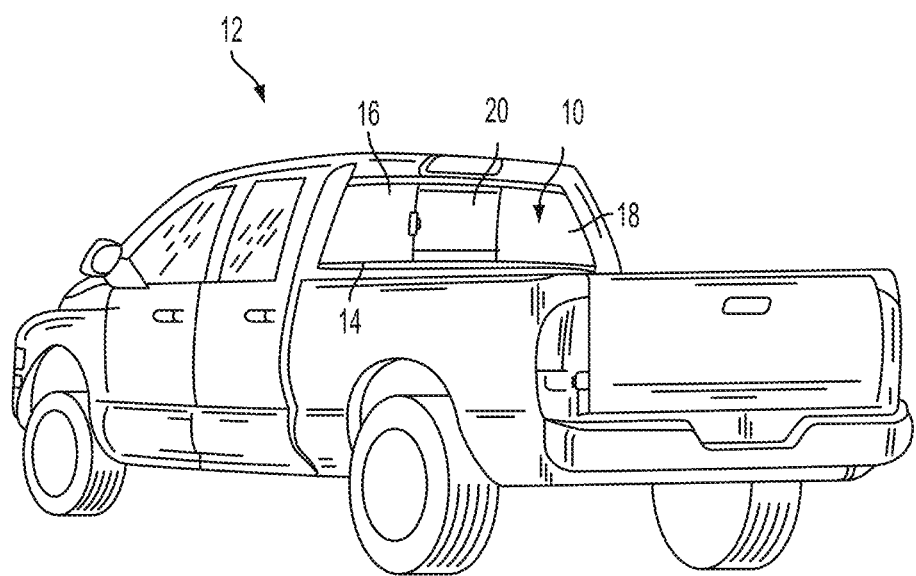
FIG. 1 is a rear perspective view of a pickup truck having a rear slider window assembly.
Figure 2:
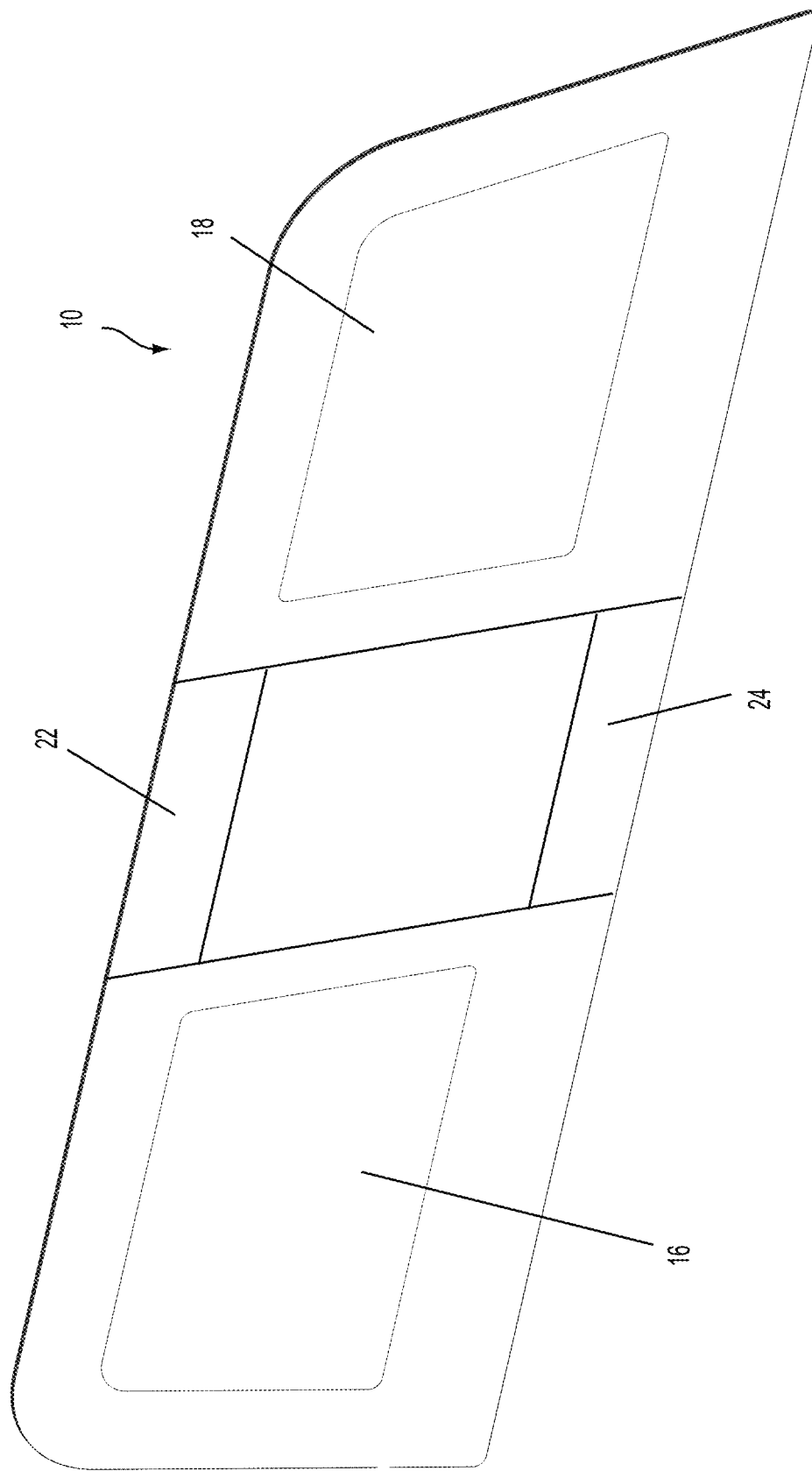
FIG. 2 is a perspective view of the rear slider window assembly.
Figure 3:
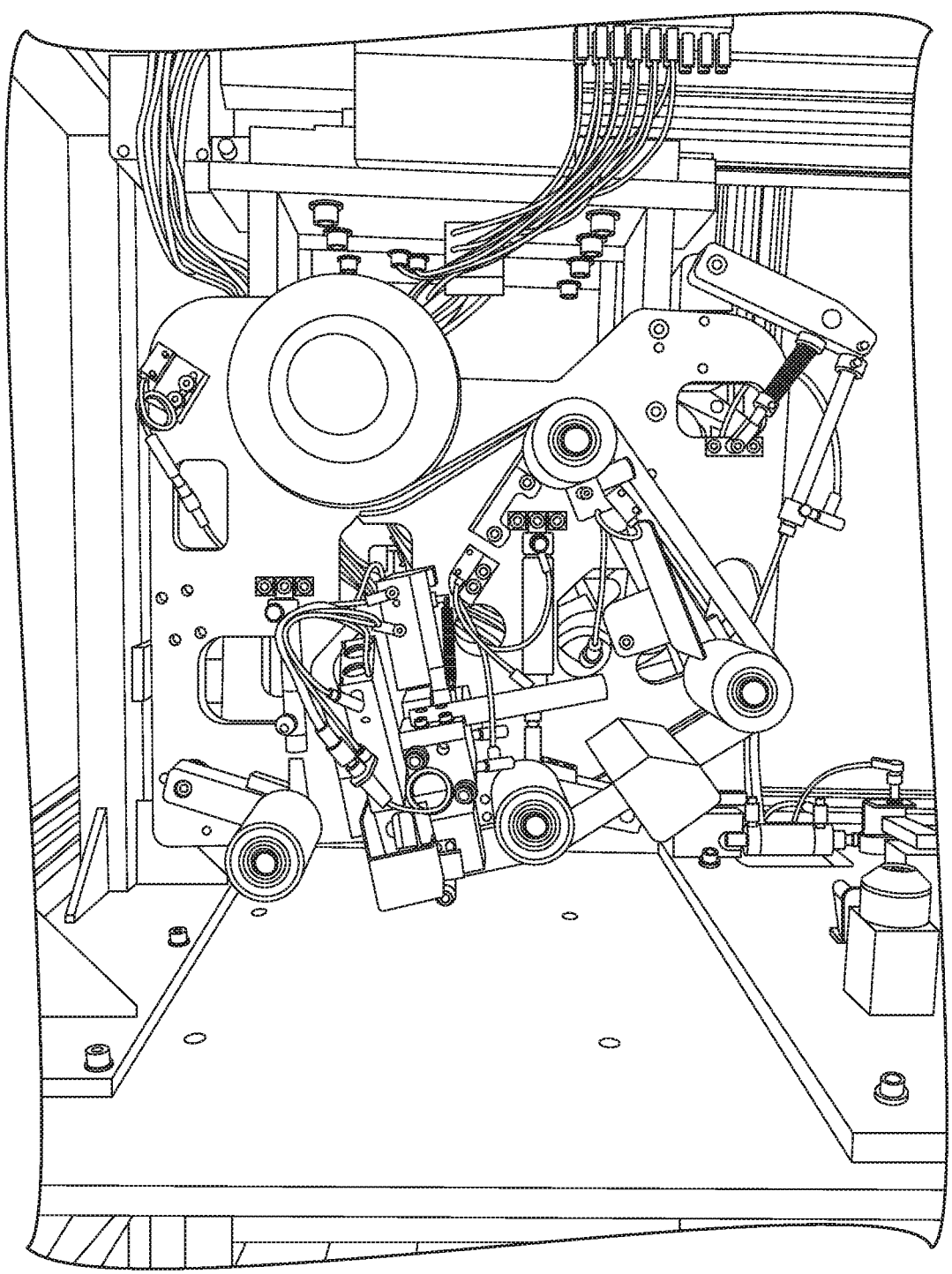
FIG. 3 is a perspective view of an applicator operable to apply two strips of masking at the upper and lower appliques of the rear slider window assembly in accordance with the present invention.
Figure 4:
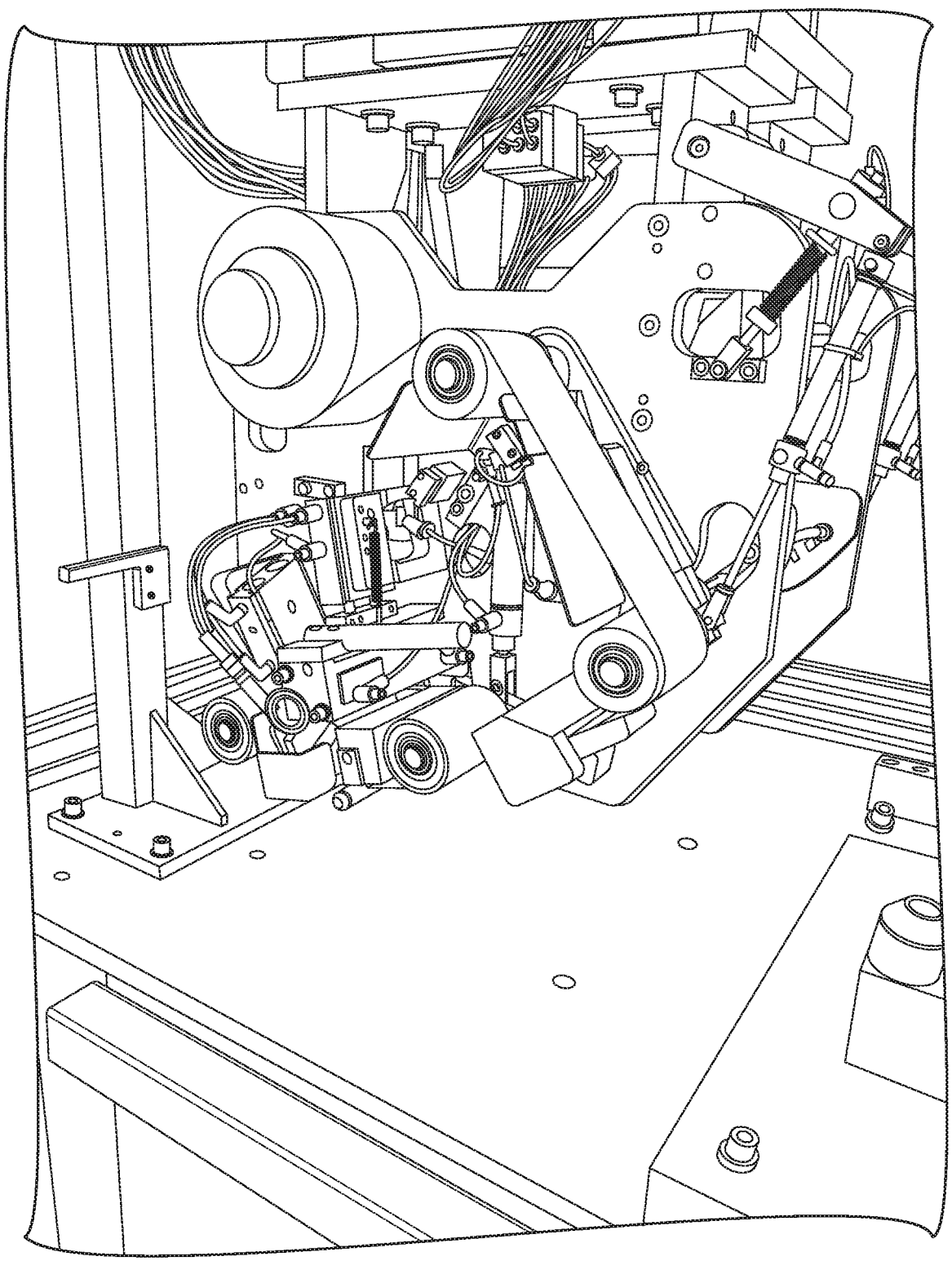
FIG. 4 is another perspective view of the applicator.
Figure 5:
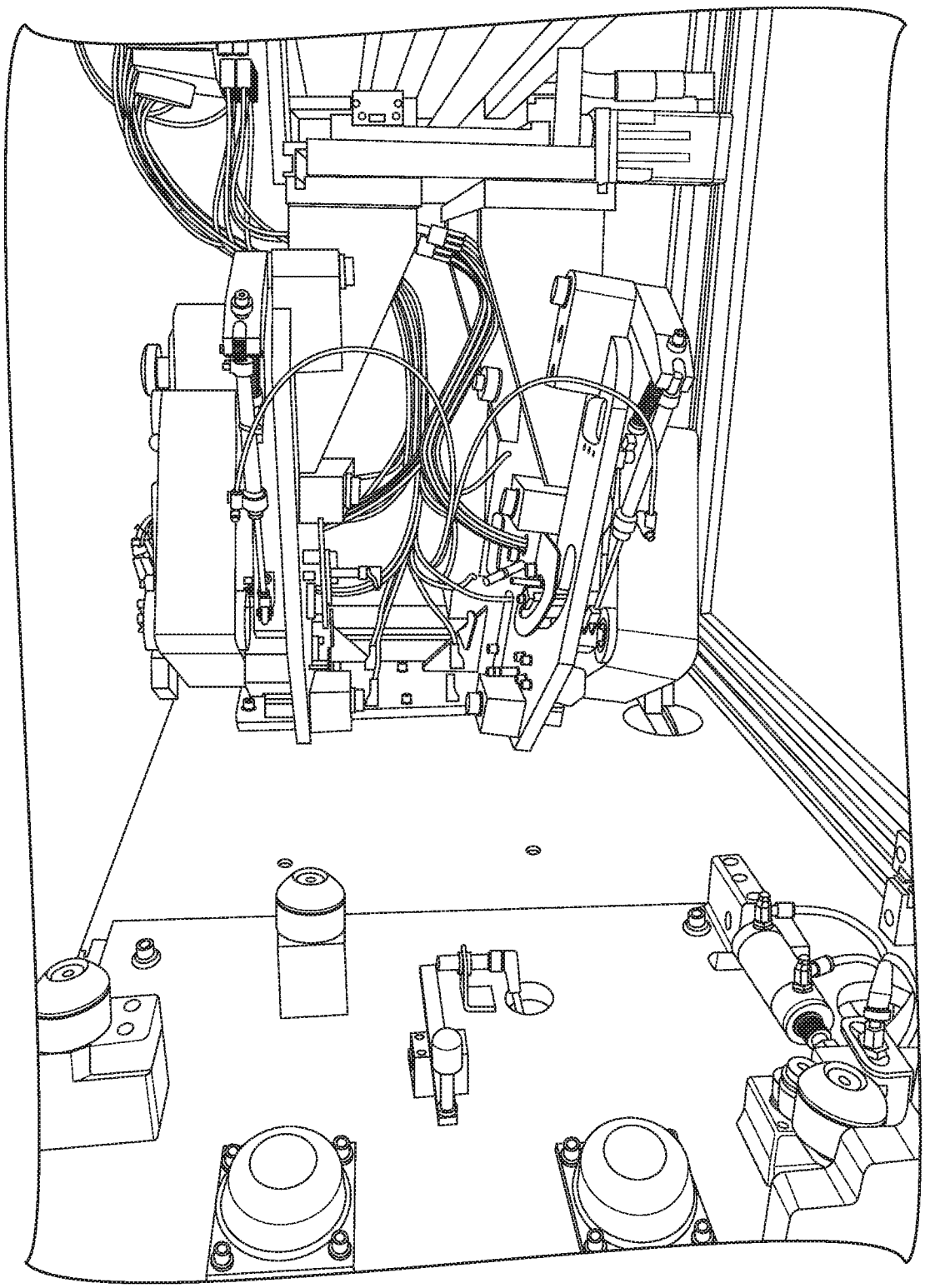
FIG. 5 is another perspective view of the applicator.
Figure 6:
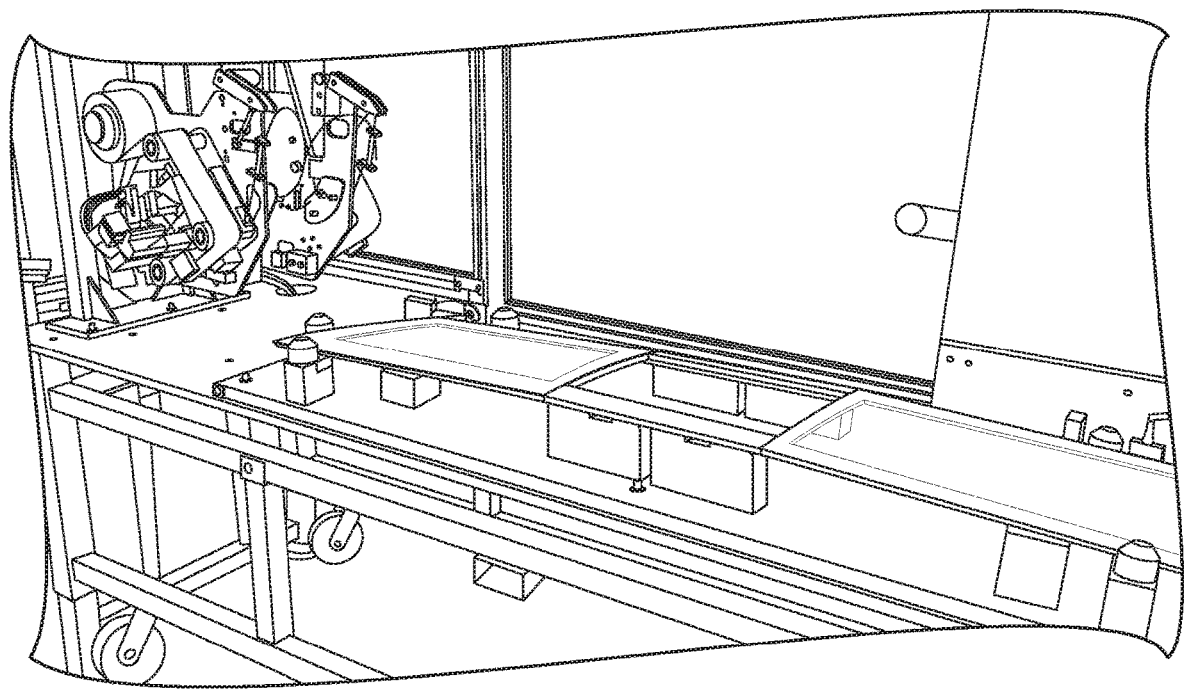
FIGS. 6-15 are perspective views of the applicator at various times during a masking application process.
Figure 7:
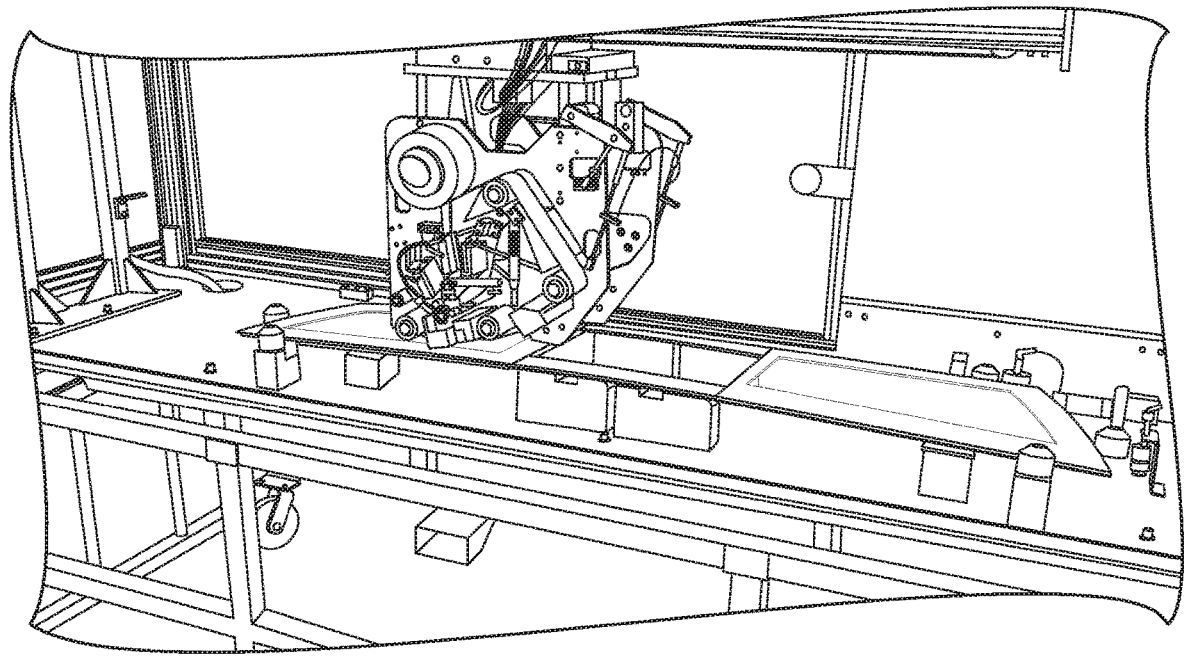
Figure 8:
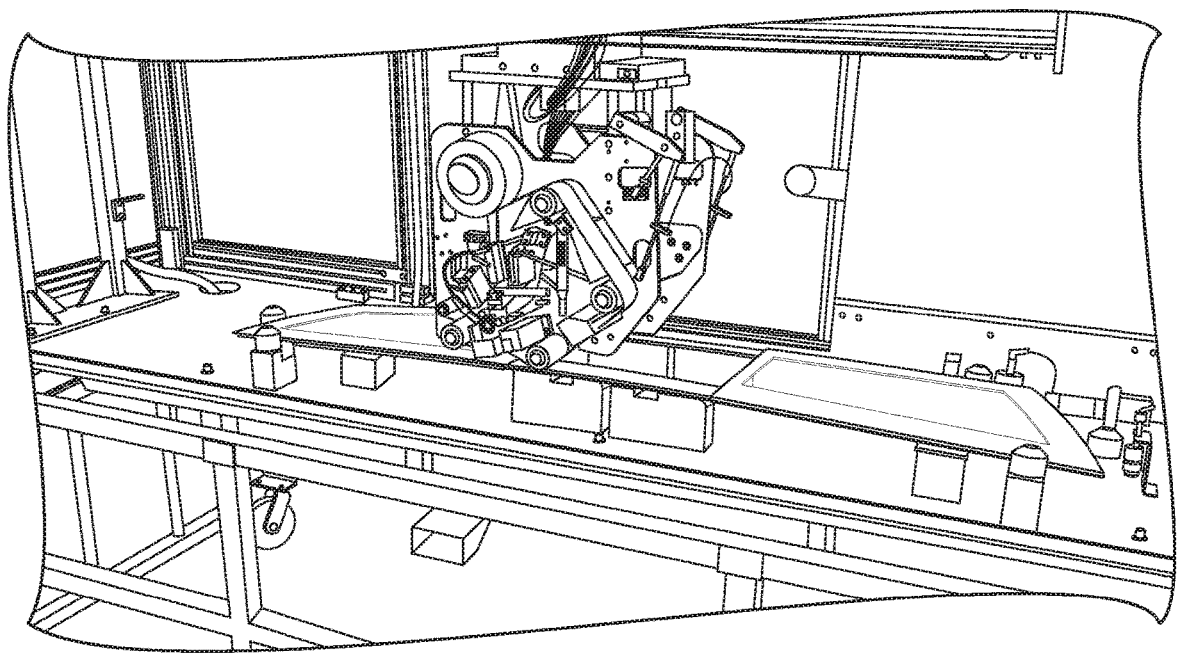

Referring now to the drawings and the illustrative embodiments depicted therein, a rear slider window assembly 10 of a vehicle 12 (such as a pickup truck or the like) includes a window frame 14, a fixed window panel 15 comprising a pair of spaced apart side fixed window panels or panel portions 16, 18 (which may be separate panels or part of a single panel 15 with an aperture 17) and a movable window panel 20 that is movable relative to frame 14 and fixed window panels 16, 18 between an opened position and a closed position. In the illustrated embodiment, window assembly 10 includes two side fixed window panels or portions 16, 18 that are spaced apart with an aperture or opening or gap 17 therebetween and with upper and lower appliques 22, 24 spanning the gap at the upper and lower regions, respectively, of the window.

The system or method or machine of the present invention provides a means for automatically (and optionally robotically) applying a masking strip to each of the upper and lower appliques of the window at the same time, which provides enhanced masking of the window and a reduction in manual labor to mask the window. The present invention provides a tape apply station with a table or support structure that holds and supports a window assembly (comprising the side fixed window panels and upper and lower appliques and frame). The applicator is movably mounted at the support structure and is linearly movable along the support structure and along and over at least a portion of the window assembly (that is secured at the support structure). The system or method provides an automatic film applicator, which may be installed on a robot or on a single axis drive system or the like.

The applicator is operable to apply a thin one sided film to the applique locations on the rear slider window. The applicator uses a roll of tape that does not have a backing. The adhesive of the tape is rolled on itself and the machine or applicator applies the film and without wrinkles or air bubbles. The machine cuts the tape and rolls the tape out in one operation. The tape applied is Autowrap GL-931 White tape.

As shown in FIGS. 3-15, the applicator machine comprises two separate applicators, each of which is operable to apply the film onto a respective applique as the machine moves the applicators over and along the appliques of the window. Each applicator comprises a spindle or roll support that supports the roll of film or tape, multiple guide spindles or rollers that guide the film as it is unrolled from the roll and applied to the appliques. The applicator includes a cutting element that cuts the tape at the desired length (at the start of the masking pass and at the end of the masking pass) so that the tape as applied is the correct length to cover the respective applique (and optionally to overlap onto the fixed window panels at each end of the appliques).

The spindles or guide rollers protrude laterally from a frame portion and may be adjustably mounted at the frame portion to adjust the tension on the film as it is unrolled and applied. The lower two spindles or rollers are movable so that they selectively engage the film at the applique during the application process.

Thus, and as can be seen with reference to FIGS. 6-15, a window assembly is secured at the support structure (such as via support elements that laterally and longitudinally hold the window assembly to limit movement of the window assembly during the film application process), with vertical supports under the window assembly, particularly at and under the appliques (to limit downward deflection of the appliques during the application process). The applicator is initially disposed at one end of the support structure (FIG. 6) with both of the lower rollers raised to an upper position so that, as the applicator is moved over the window assembly toward the appliques (FIG. 7), the lower rollers do not contact the window assembly.

Figure 9:
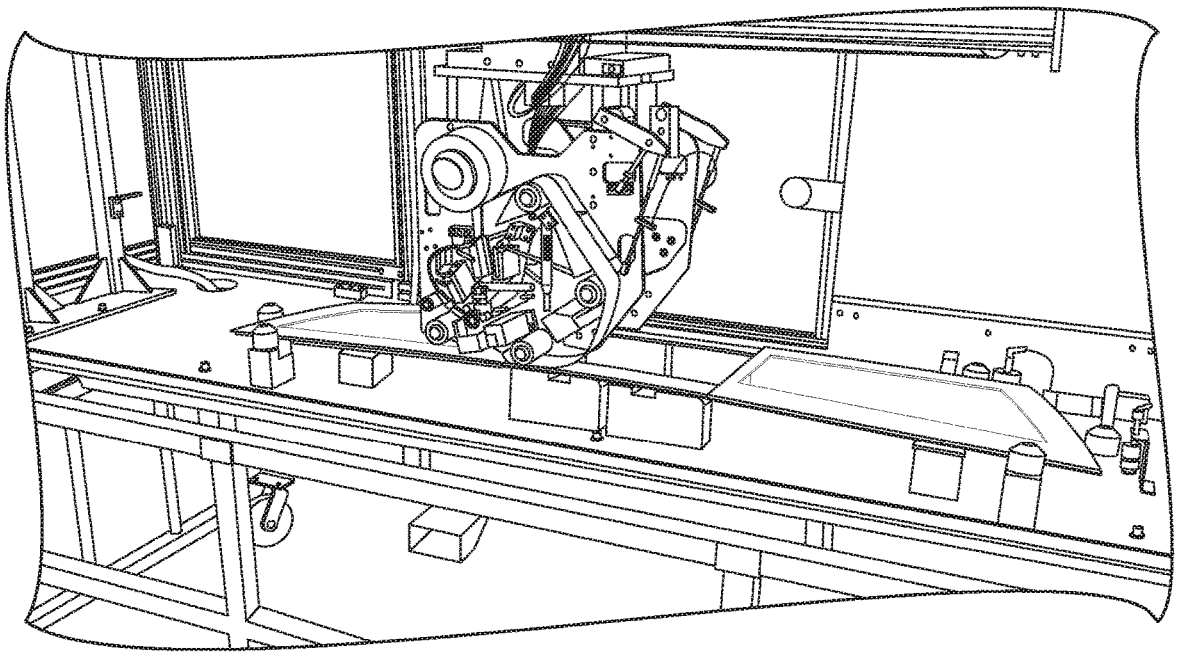
Figure 10:
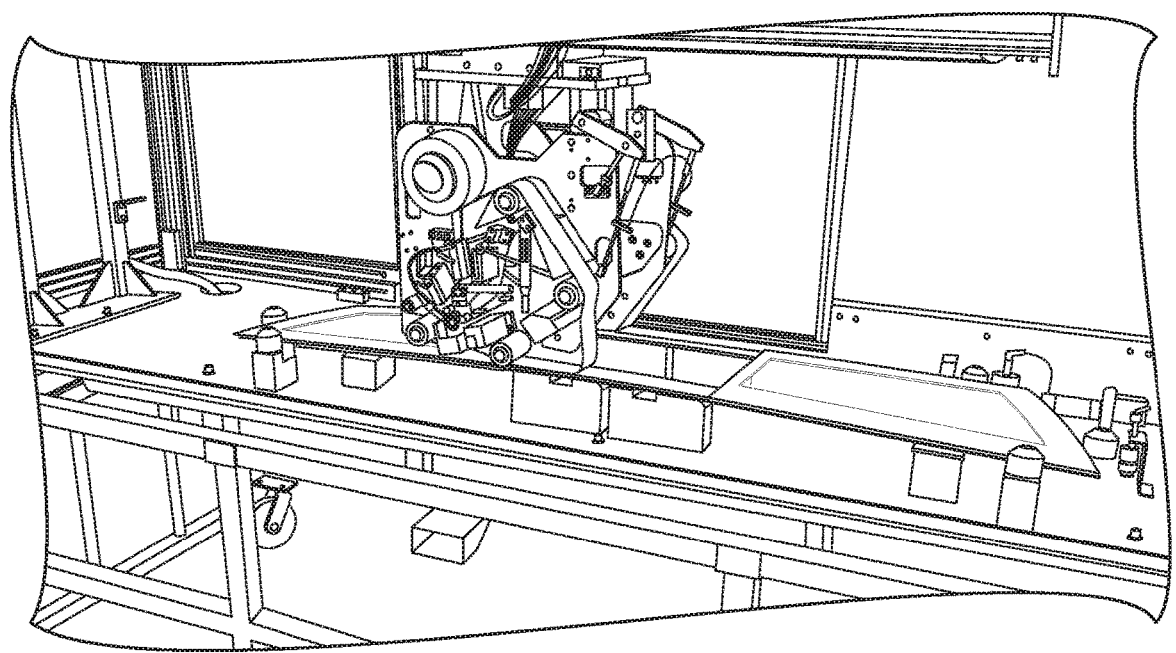
Figure 11:
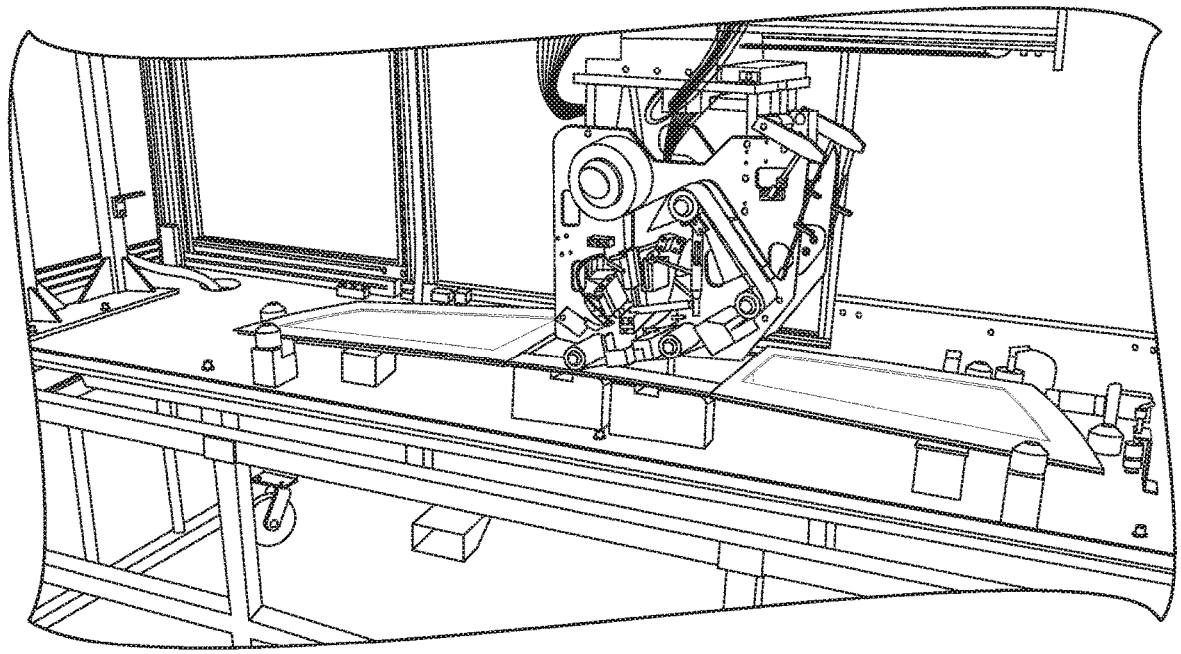
Figure 12:
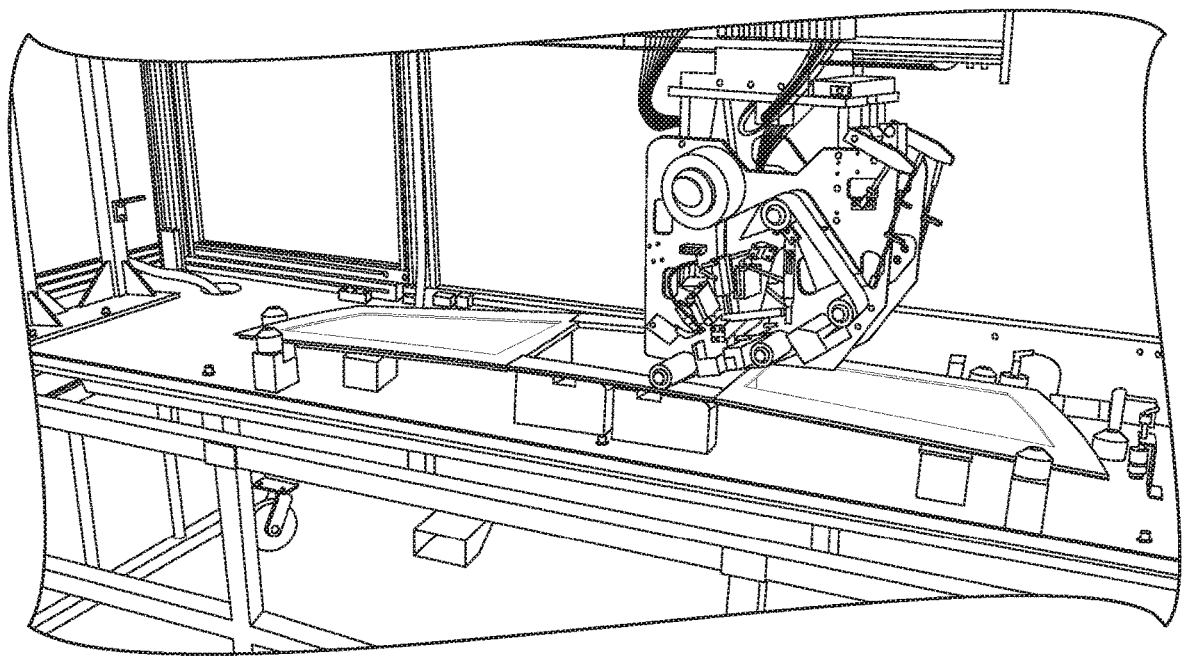

When the applicator is positioned partially over the appliques, the forward lower roller is moved downward to press the film (with its adhesive side down) toward and against the applique (FIG. 8), while the cutting device cuts the film at its end and/or releases the film so that the free end of the film drops down onto the applique. The applicator is moved backward (toward its initial location) with the forward lower rolling along the film to press the free end onto the applique (FIGS. 9 and 10). The forward roller is then raised and the rearward lower roller is lowered to engage the film, and the applicator is moved forward along the window assembly with the rear lower roller rolling along the film to press the film onto the applique (FIG. 11). Because the forward lower roller has pressed the end region of the film against the applique, the film is attached at the applique such that forward movement of the applicator pulls at the film and the film is unrolled from the spindle and applied to the applique by the rear lower roller as the applicator moves along the window panel and appliques.

Figure 13:
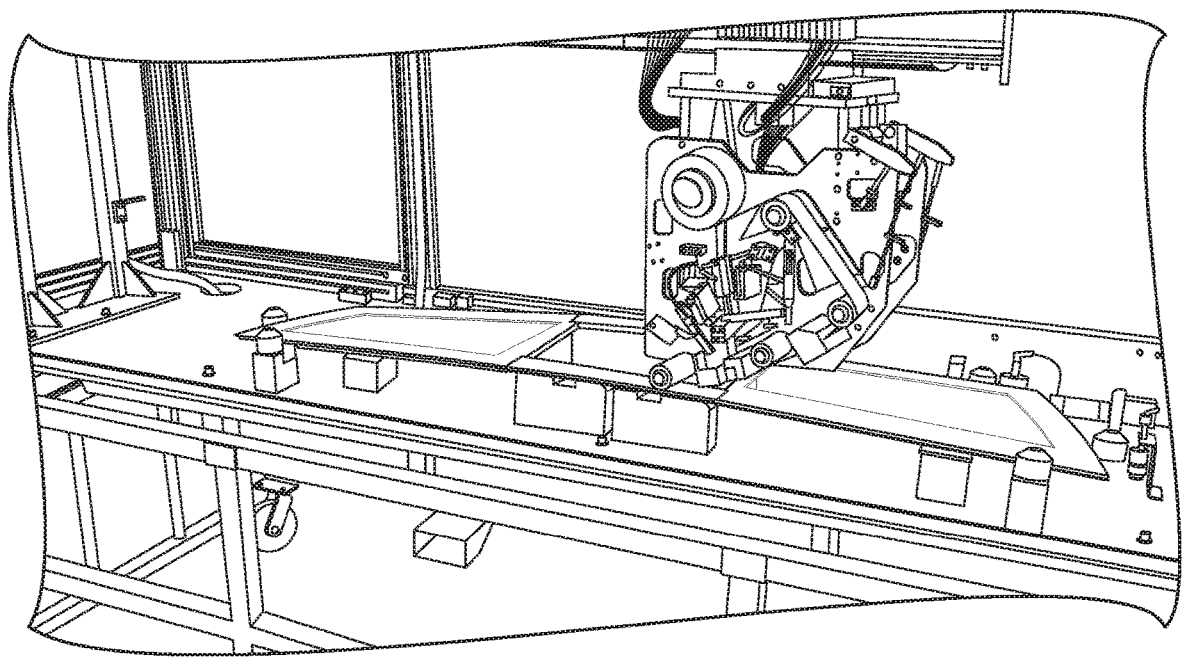
Figure 14:
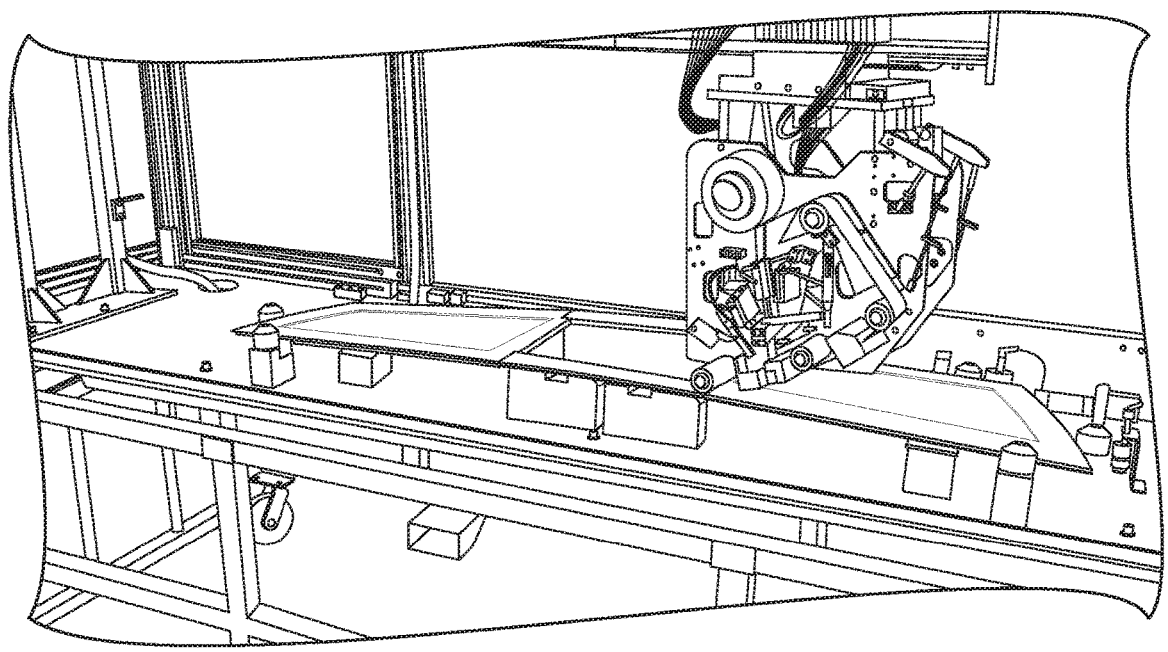
Figure 15:
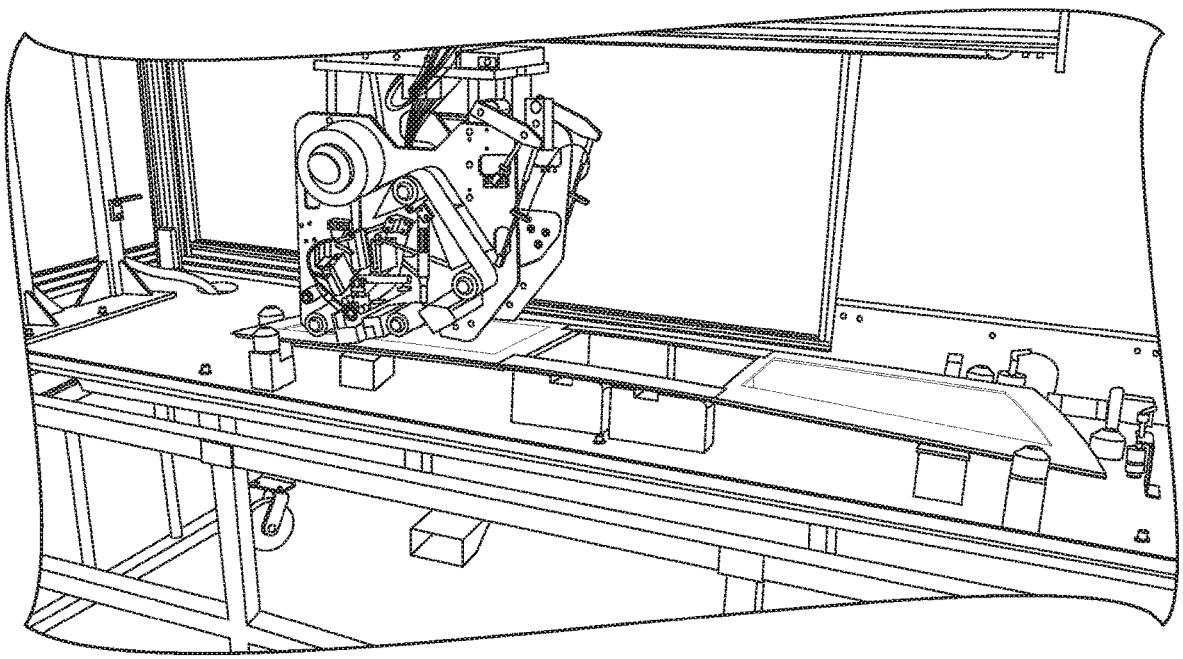
Figure 16:
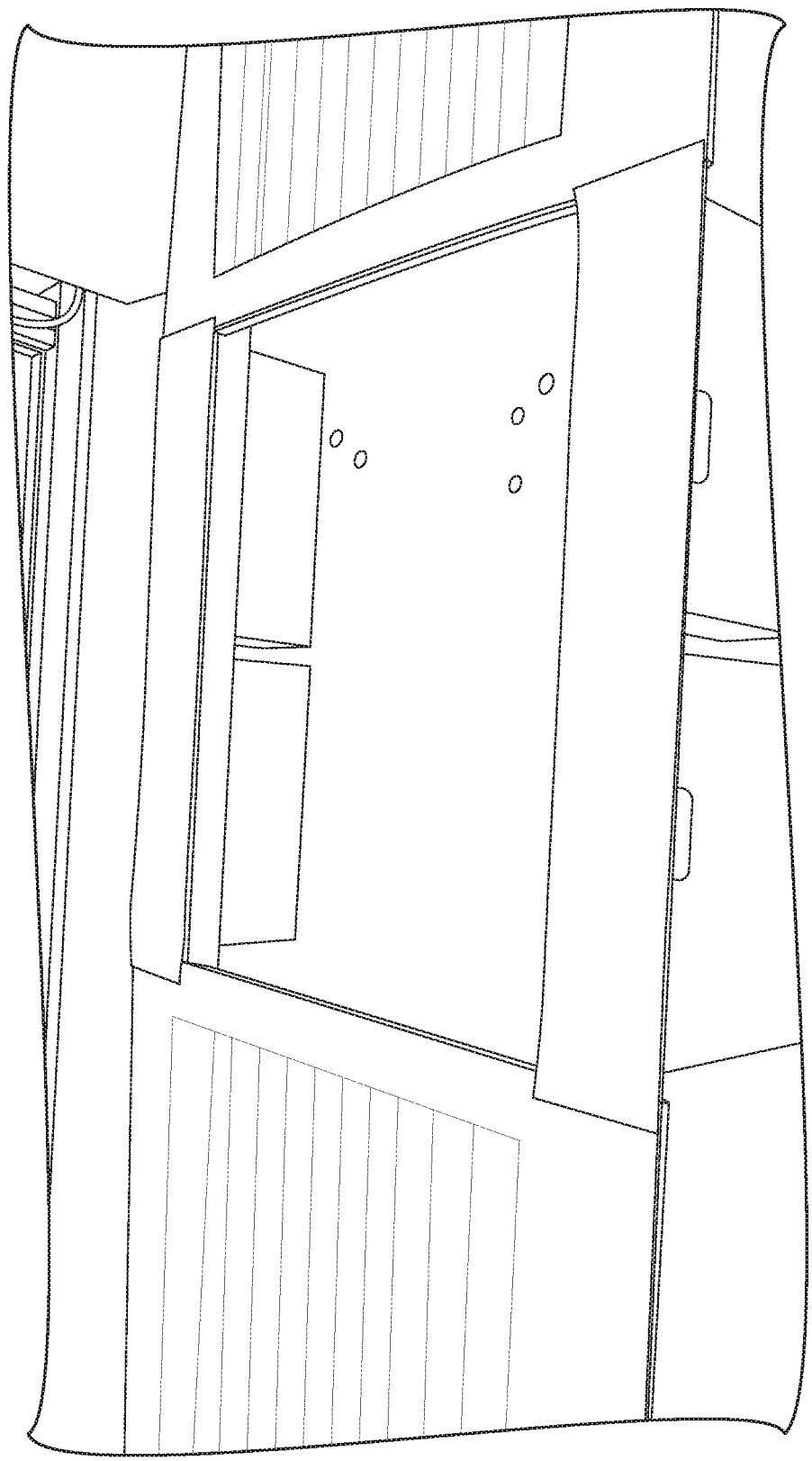
FIG. 16 is a perspective view of the window assembly shown in FIGS. 6-15, with the film strips adhesively attached at the appliques.

When the applicator gets to where the film being applied is at the end of the applique (FIG. 12), the film is cut so that its end falls onto the applique (FIG. 13). The applicator continues moving forward so the rear lower roller presses the end of the film onto the applique (FIG. 14). Optionally, the cut end may be held while the roller moves toward the film and presses the film toward and against the applique such that the film is held in tension throughout the application process. The lower rollers are raised and the applicator returns to its initial position (FIG. 15). As shown in FIGS. 15 and 16, when the applicator has finished, the film strips are pressed onto and adhered to the appliques with minimal bubbling or detachment over the entire length of the applique. Although shown and described for only one side of the applicator (and for one applique), the other side of the applicator functions in an identical manner and in tandem with the applicator to apply its strip of film to the other applique.

The applicator is programmed for a particular window assembly, such as by entering dimensions and locations into its processor so that the applicator lowers the rollers and cuts the film at the appropriate locations along the window assembly and support structure. Optionally, the applicator may be adjustable in width to adapt the applicator for different window assemblies so that the strips of film being applied are at a desired or selected distance apart to be applied to the appliques of the particular window disposed at the support structure. Also, and such as can be seen with reference to FIG. 5, the side applicators may be angled so that the rollers are parallel to the surface of the appliques of the particular window assembly. The angles of the side applicators and rollers may be adjusted for the particular window assembly and may be dynamically adjusted during the application process to account for the contour of the outer surfaces of the appliques. The applicator thus may be programmed and adjusted or set to apply the strips of film for any window application, and thus may move the rollers and film over the particular shape and contour of the appliques. Optionally, the applicator may be used to apply a film or mask onto other window assemblies or panels for a vehicle, while remaining within the spirit and scope of the present invention.

Thus, the present invention provides a method for masking a rear slider window assembly. The rear slider window assembly includes a movable window that is moved along rails between an opened and closed position relative to a fixed window panels and aperture or opening (such as by utilizing aspects of the window assemblies described in U.S. Pat. Nos. 8,402,695; 8,322,073; 7,838,115; 7,332,225; 7,073,293; 7,003,916; 6,846,039; 6,691,464; 6,319,344; 6,068,719 and 5,853,895, and/or U.S. Pub. No. Nos. US-2013/0174488; US-US-2011-0056140; US-2006/0107600; US-2008/0127563; US-2004/0020131 and/or US-2003/0213179, which are all hereby incorporated herein by reference in their entireties).

Changes and modifications to the specifically described embodiments may be carried out without departing from the principles of the present invention, which is intended to be limited only by the scope of the appended claims, as interpreted according to the principles of patent law.

The invention claimed is:

1. A method of applying a film to upper and lower appliques of a rear slider window assembly for a vehicle, said method comprising:

providing a support structure configured to support a rear slider window assembly thereat;

positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;

providing an applicator that is movable along the support structure;

wherein the applicator comprises first and second application devices each operable to dispense a strip of film onto a respective one of the appliques;

moving the applicator to a starting position where a roller of each application device presses an end region of the film onto the respective applique;

moving the applicator along the appliques with a roller of each application device rolling along the respective applique to press the film onto the respective applique;

after the film is pressed onto the respective applique, cutting the film strips at the ends of the appliques and pressing the cut ends onto the respective appliques;

wherein a front roller of each application device presses the end region of the film onto the respective applique at the starting position; and lowering the front roller of each application device toward the respective applique as the applicator is moved toward the starting position to press the end region of the film onto the respective applique.

2. The method of claim 1, wherein the first and second application devices operate in tandem.

3. The method of claim 1, wherein a rear roller of each application device rolls along the film to press the film onto the respective applique while the applicator moves along the support structure.

4. A method of applying a film to upper and lower appliques of a rear slider window assembly for a vehicle, said method comprising:

providing a support structure configured to support a rear slider window assembly thereat;
positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;
providing an applicator that is movable along the support structure;
wherein the applicator comprises first and second application devices each operable to dispense a strip of film onto a respective one of the appliques;
moving the applicator to a starting position where a roller of each application device presses an end region of the film onto the respective applique;
moving the applicator along the appliques with a roller of each application device rolling along the respective applique to press the film onto the respective applique;
after the film is pressed onto the respective applique, cutting the film strips at the ends of the appliques and pressing the cut ends onto the respective appliques;
wherein a front roller of each application device presses the end region of the film onto the respective applique at the starting position;
wherein a rear roller of each application device rolls along the film to press the film onto the respective applique while the applicator moves along the support structure; and
lowering the rear roller of each application device toward the respective applique as the rear roller is moved toward where the front roller has pressed the end region of the film onto the respective applique.

5. A method of applying a film to upper and lower appliques of a rear slider window assembly for a vehicle, said method comprising:
providing a support structure configured to support a rear slider window assembly thereat;
positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;
providing an applicator that is movable along the support structure;
wherein the applicator comprises first and second application devices each operable to dispense a strip of film onto a respective one of the appliques;
moving the applicator to a starting position where a roller of each application device presses an end region of the film onto the respective applique;
moving the applicator along the appliques with a roller of each application device rolling along the respective applique to press the film onto the respective applique;
after the film is pressed onto the respective applique, cutting the film strips at the ends of the appliques and pressing the cut ends onto the respective appliques;
wherein a front roller of each application device presses the end region of the film onto the respective applique at the starting position;
wherein a rear roller of each application device rolls along the film to press the film onto the respective applique while the applicator moves along the support structure; and
providing at least one upper roller that guides the film from a roll of film to the front roller.

6. A method of applying a film to upper and lower appliques of a rear slider window assembly for a vehicle, said method comprising:
providing a support structure configured to support a rear slider window assembly thereat;
positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;
providing an applicator that is movable along the support structure;
wherein the applicator comprises first and second application devices each operable to dispense a strip of film onto a respective one of the appliques;
moving the applicator to a starting position where a roller of each application device presses an end region of the film onto the respective applique;
moving the applicator along the appliques with a roller of each application device rolling along the respective applique to press the film onto the respective applique;
after the film is pressed onto the respective applique, cutting the film strips at the ends of the appliques and pressing the cut ends onto the respective appliques; and
wherein the applicator is part of a robot that automatically moves the applicator to the starting position and along the appliques.

7. A method of applying a film to upper and lower appliques of a rear slider window assembly for a vehicle, said method comprising:
providing a support structure configured to support a rear slider window assembly thereat;
positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;
providing an applicator that is movable along the support structure;
wherein the applicator comprises first and second application devices each operable to dispense a strip of film onto a respective one of the appliques;
moving the applicator to a starting position where a roller of each application device presses an end region of the film onto the respective applique;
moving the applicator along the appliques with a roller of each application device rolling along the respective applique to press the film onto the respective applique;
after the film is pressed onto the respective applique, cutting the film strips at the ends of the appliques and pressing the cut ends onto the respective appliques; and
wherein moving the applicator to the starting position comprises moving the applicator to a starting position where a roller of each application device is positioned at an inboard edge region of a first fixed window panel of the spaced apart window panels and presses the end region of the film onto the inboard edge region of the first fixed window panel before pressing the end region of the film onto the respective applique.

8. A method of applying a film to upper and lower appliques of a rear slider window assembly for a vehicle, said method comprising:
providing a support structure configured to support a rear slider window assembly thereat;

positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;

providing an applicator that is movable along the support structure;

wherein the applicator comprises first and second application devices each operable to dispense a strip of film onto a respective one of the appliques;

moving the applicator to a starting position where a roller of each application device presses an end region of the film onto the respective applique;

moving the applicator along the appliques with a roller of each application device rolling along the respective applique to press the film onto the respective applique;

after the film is pressed onto the respective applique, cutting the film strips at the ends of the appliques and pressing the cut ends onto the respective appliques; and comprising providing a roll of film at each of the application devices, and wherein the strip of film that is dispensed and pressed onto the respective applique and cut comprises a strip of film that is unrolled from the respective roll of film as the application devices are moved along the appliques.

9. The method of claim 8, wherein pressing the cut ends onto the respective appliques comprises pressing the cut ends onto an inboard edge region of a second fixed window panel of the spaced apart window panels.

10. The method of claim 8, wherein each roll of film comprises a roll of tape that does not have a backing, and wherein an adhesive surface of each of the rolls of tape is pressed onto the respective applique.

11. A method of applying a film to upper and lower appliques of a rear slider window assembly for a vehicle, said method comprising:

providing a support structure configured to support a rear slider window assembly thereat;

positioning a rear slider window assembly at the support structure, wherein the rear slider window assembly comprises a pair of spaced apart fixed window panels, upper and lower appliques extending between the spaced apart fixed window panels, and a frame portion attached at the fixed window panels and the appliques;

providing an applicator that is movable along the support structure;

wherein the applicator comprises first and second application devices each operable to dispense a strip of film onto a respective one of the appliques;

moving the applicator to a starting position where a roller of each application device presses an end region of the film onto the respective applique;

moving the applicator along the appliques with a roller of each application device rolling along the respective applique to press the film onto the respective applique;

after the film is pressed onto the respective applique, cutting the film strips at the ends of the appliques and pressing the cut ends onto the respective appliques; and wherein moving the applicator to the starting position comprises moving the applicator along and over one of the fixed window panels with the roller of both of the application devices raised above the one of the fixed window panels.

12. A method of applying a film to upper and lower appliques of a rear slider window assembly for a vehicle, said method comprising:

providing a support structure configured to support a rear slider window assembly thereat;

positioning a rear slider window assembly at the support structure, wherein the rear slider window assembly comprises spaced apart first and second fixed window panels, upper and lower appliques extending between the spaced apart fixed window panels, and a frame portion attached at the first and second fixed window panels and the upper and lower appliques;

providing an applicator that is movable along the support structure;

wherein the applicator comprises first and second application devices each operable to dispense film onto a respective one of the upper and lower appliques;

wherein each of the first and second application devices comprises a front roller and a rear roller and a film holder that holds a roll of film;

wherein each roll of film comprises a roll of film having an adhesive side and a non-adhesive side;

moving the applicator along and over the first fixed window panel with the front and rear rollers of both of the application devices raised above the first fixed window panel;

moving the applicator to a starting position where the front roller of each application device presses the adhesive side of a starting end of the film onto the respective applique;

moving the applicator along the appliques with the rear roller of each application device rolling along the respective applique to press the adhesive side of the film onto the respective applique; and after the film is pressed onto the respective applique, cutting the film and pressing the adhesive side of the cut ends of the film onto the respective appliques with the rear roller.

13. The method of claim 12, wherein the first and second application devices operate in tandem.

14. The method of claim 12, comprising lowering the front roller of each application device toward the respective applique as the applicator is moved toward the starting position to press the end region of the film onto the respective applique with the front roller of the respective application device.

15. The method of claim 14, comprising lowering the rear roller of each application device toward the respective applique as the rear roller is moved toward where the front roller has pressed the end region of the film onto the respective applique.

16. The method of claim 12, comprising at least one upper roller that guides the film from the roll of film to the front roller.

17. The method of claim 12, wherein moving the applicator to the starting position comprises moving the applicator to a starting position where the front roller of each application device is positioned at an inboard edge region of the first fixed window panel and presses the end region of the film onto the inboard edge region of the first fixed window panel before pressing the end region of the film onto the respective applique.

18. The method of claim 17, wherein pressing the cut ends onto the respective appliques comprises pressing the cut ends onto an inboard edge region of the second fixed window panel.

* * * * *